United States Patent
Ohmura et al.

(10) Patent No.: US 11,016,058 B2
(45) Date of Patent: May 25, 2021

(54) SAMPLE SUPPORT BODY

(71) Applicant: HAMAMATSU PHOTONICS K.K., Hamamatsu (JP)

(72) Inventors: Takayuki Ohmura, Hamamatsu (JP); Masahiro Kotani, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 16/644,743

(22) PCT Filed: Aug. 22, 2018

(86) PCT No.: PCT/JP2018/031036
§ 371 (c)(1),
(2) Date: Mar. 5, 2020

(87) PCT Pub. No.: WO2019/058857
PCT Pub. Date: Mar. 28, 2019

(65) Prior Publication Data
US 2020/0264134 A1 Aug. 20, 2020

(30) Foreign Application Priority Data
Sep. 21, 2017 (JP) .............................. JP2017-181597

(51) Int. Cl.
*G01N 27/62* (2021.01)
*H01J 49/04* (2006.01)
(Continued)

(52) U.S. Cl.
CPC .......... *G01N 27/62* (2013.01); *H01J 49/0418* (2013.01); *H01J 49/0431* (2013.01)

(58) Field of Classification Search
CPC .. G01N 27/62; H01J 49/0418; H01J 49/0431; H01J 49/04; H01J 49/10; H01J 49/16
(Continued)

(56) References Cited

U.S. PATENT DOCUMENTS

| 7,695,978 B2 | 4/2010 | Laprade et al. |
| 2020/0219712 A1* | 7/2020 | Ohmura ................ G01N 27/62 |

(Continued)

FOREIGN PATENT DOCUMENTS

| JP | 2003-510776 A | 3/2003 |
| JP | 3122331 U | 6/2006 |

(Continued)

OTHER PUBLICATIONS

International Preliminary Report on Patentability dated Apr. 2, 2020 for PCT/JP2018/031036.

*Primary Examiner* — Nicole M Ippolito
(74) *Attorney, Agent, or Firm* — Faegre Drinker Biddle & Reath LLP

(57) ABSTRACT

Provided is a sample support body that includes a substrate, an ionization substrate, a support, and a frame. The ionization substrate has a plurality of measurement regions for dropping a sample on second surface. A plurality of through-holes that open in a first surface and the second surface are formed at least in the measurement regions of the ionization substrate. A conductive layer is provided on peripheral edges of the through-holes at least on the second surface. The frame has a wall provided on peripheral edges of the measurement regions on the second surface to separate the plurality of measurement regions when viewed in the direction in which the substrate and the ionization substrate face each other.

11 Claims, 10 Drawing Sheets

(51) Int. Cl.
*H01J 49/10* (2006.01)
*H01J 49/16* (2006.01)

(58) Field of Classification Search
USPC ...... 250/440.11, 441.11, 442.11, 443.1, 281, 250/282, 288
See application file for complete search history.

(56) References Cited

U.S. PATENT DOCUMENTS

2020/0273688 A1\* 8/2020 Ohmura ................ G01N 27/62
2020/0273689 A1\* 8/2020 Naito ..................... G01N 27/62

FOREIGN PATENT DOCUMENTS

| | | |
|---|---|---|
| JP | 2014-21048 A | 2/2014 |
| JP | 2015-197305 A | 11/2015 |
| WO | WO-01/023863 A2 | 4/2001 |
| WO | WO-2007/046162 A1 | 4/2007 |
| WO | WO-2007/066518 A1 | 6/2007 |
| WO | WO-2017/038709 A1 | 3/2017 |
| WO | WO-2017/038710 A1 | 3/2017 |

\* cited by examiner

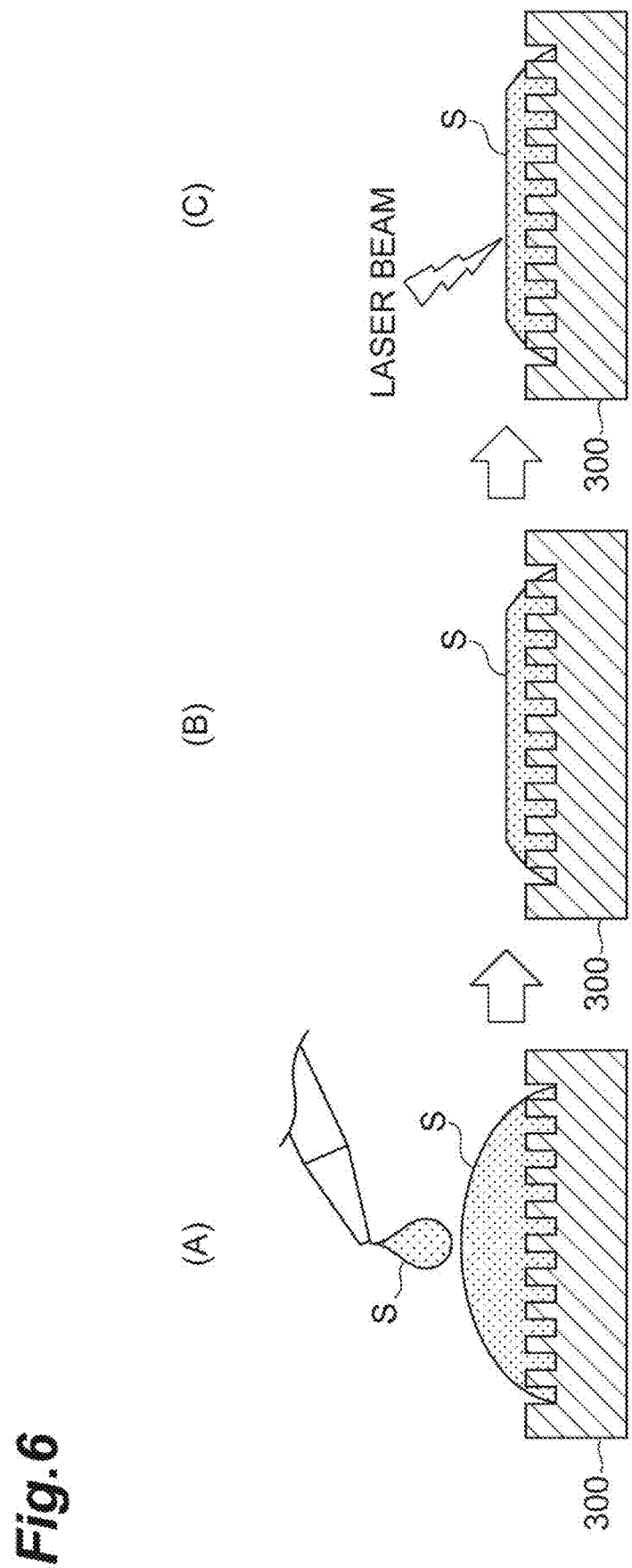

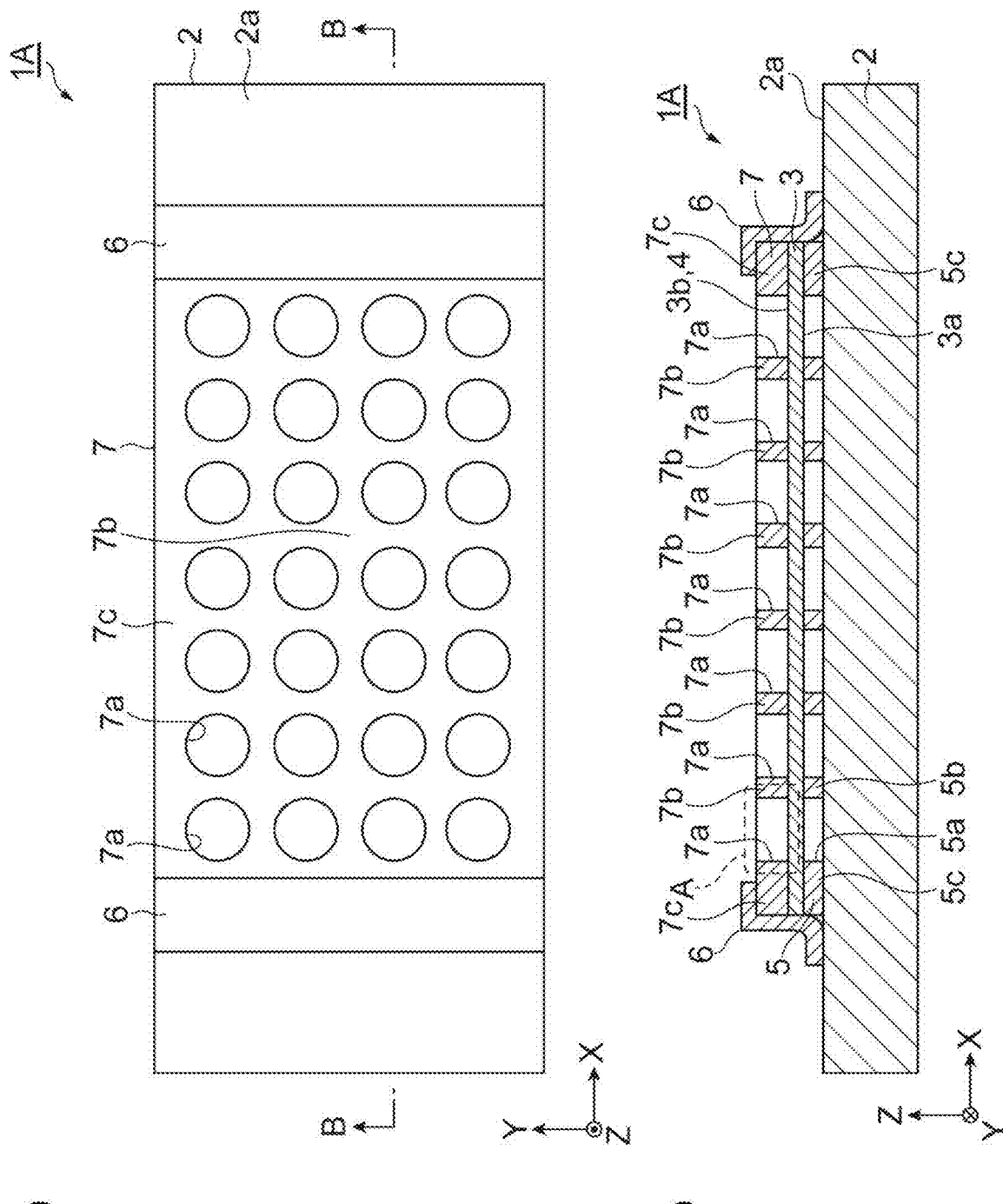

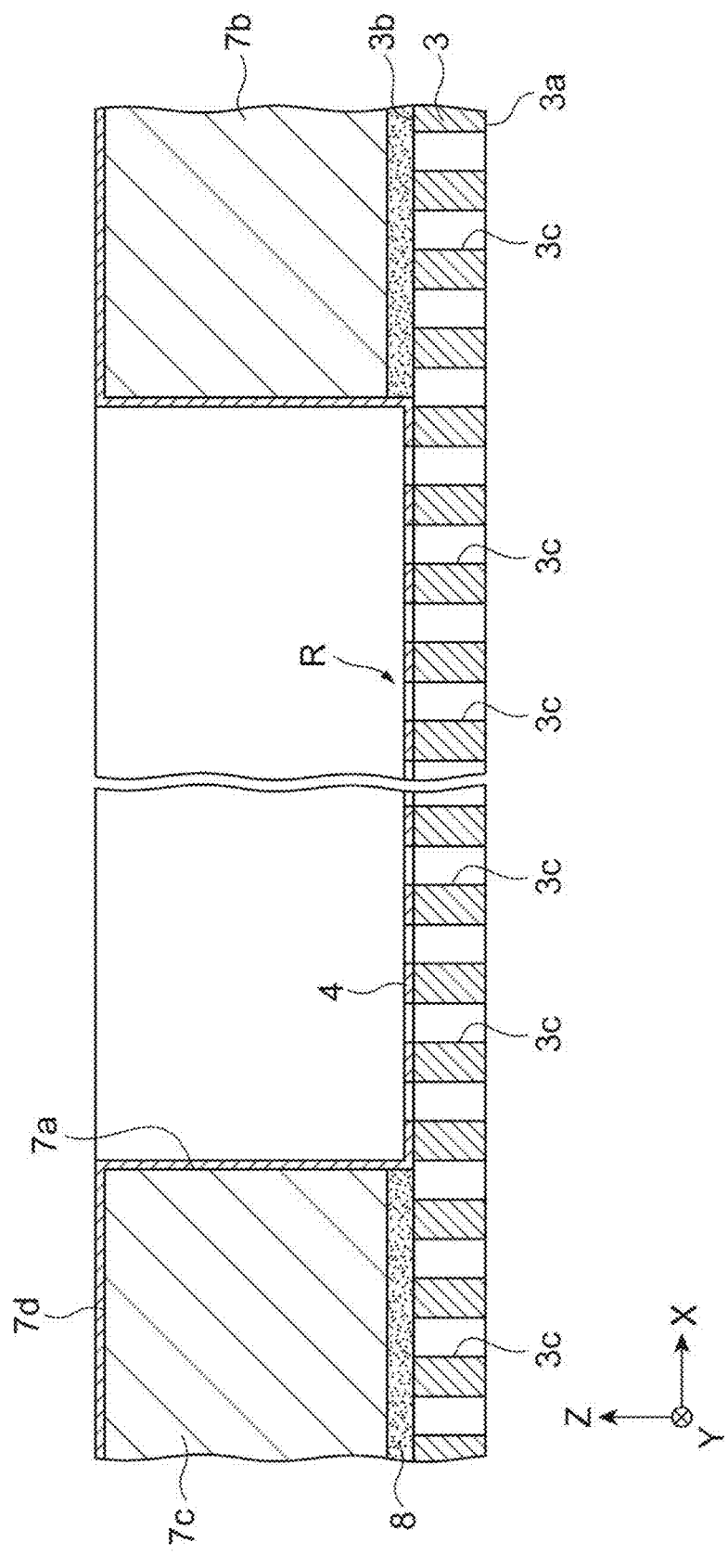

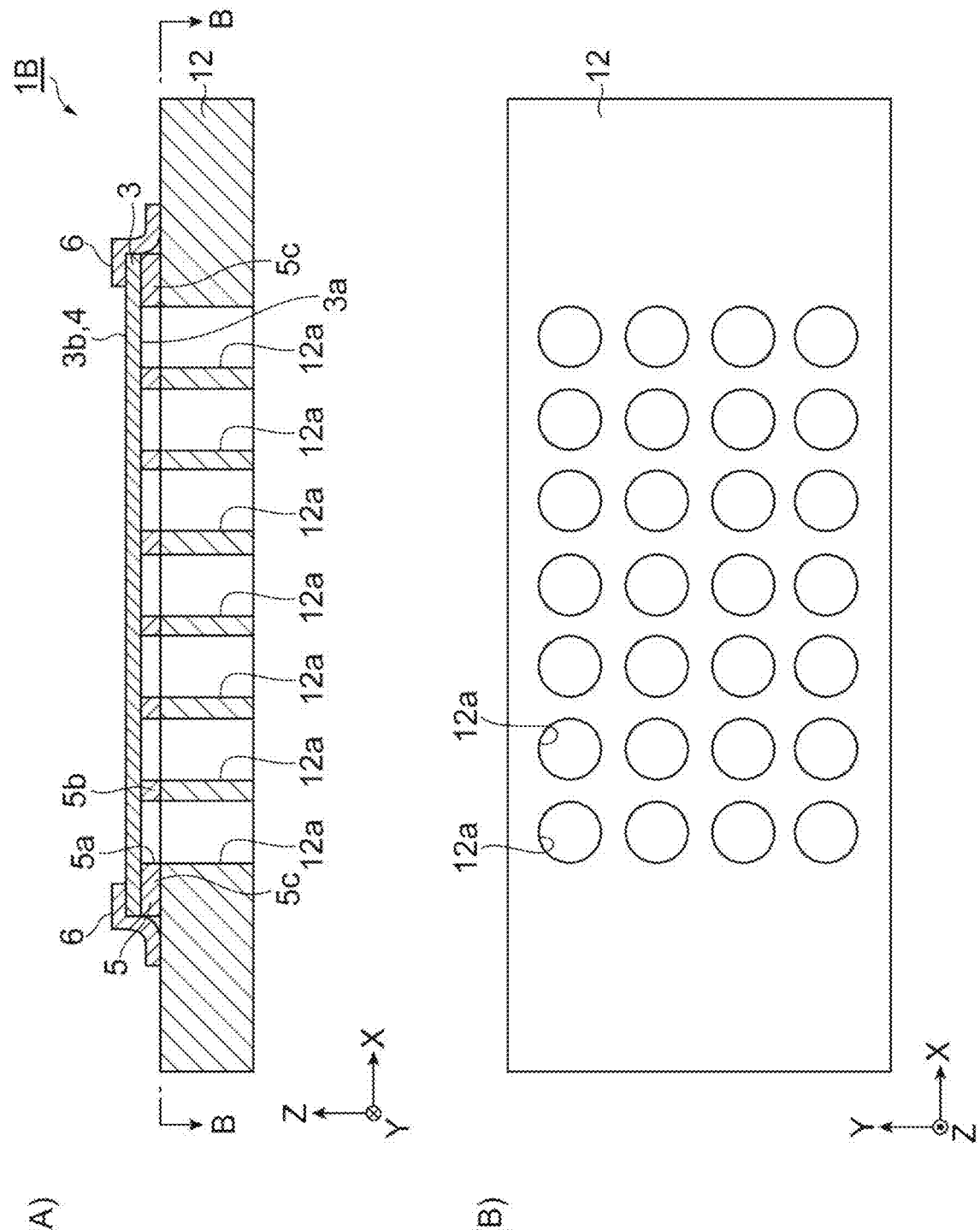

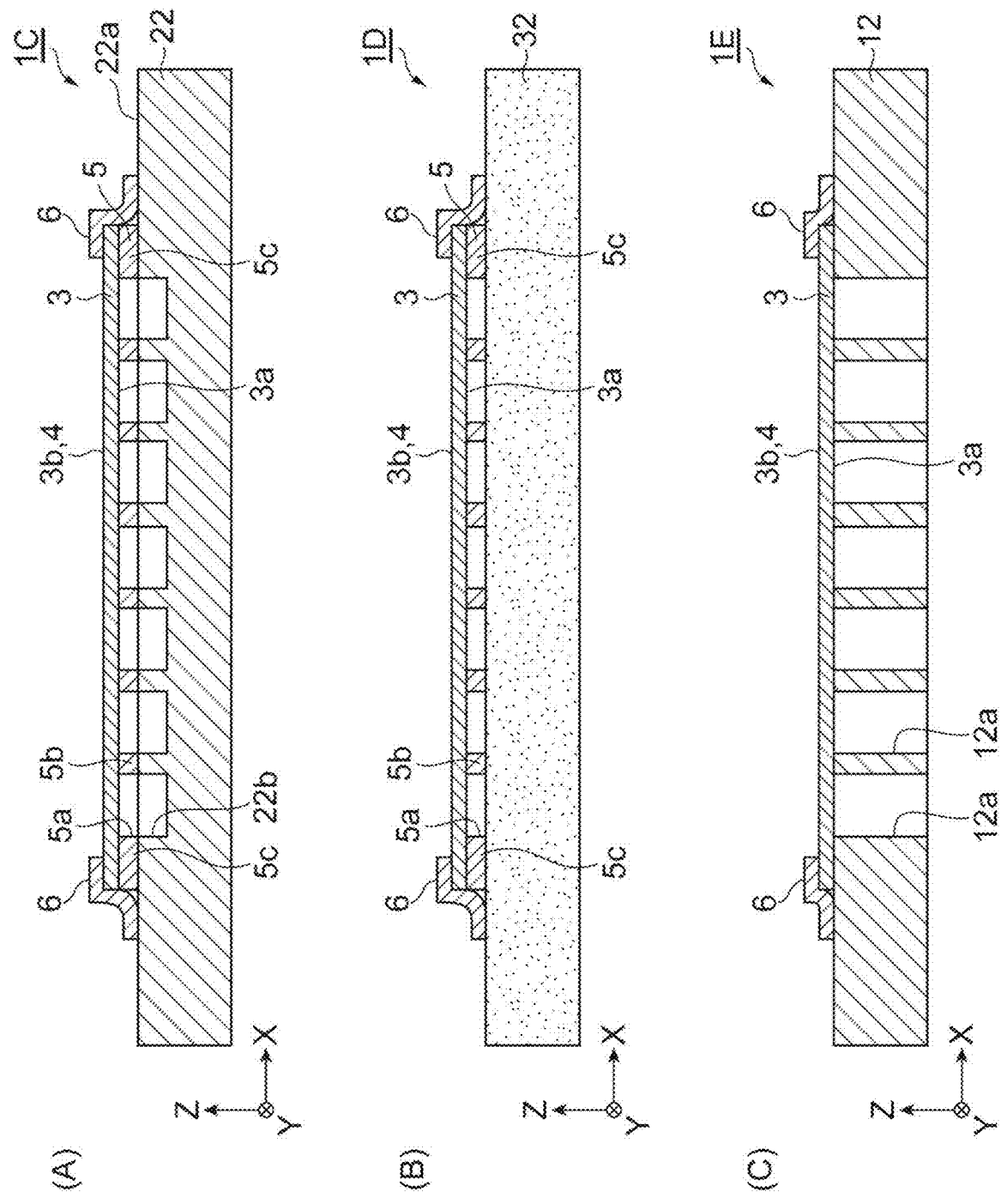

SAMPLE SUPPORT BODY

TECHNICAL FIELD

The present disclosure relates to a sample support body.

BACKGROUND ART

Conventionally, a technique for performing mass spectrometry by applying a laser beam to a sample, ionizing a compound in the sample, and detecting the ionized sample is known. Patent Literature 1 discloses a technique for performing ionization on a sample by disposing a fixing plate in which a plurality of through-holes (in units of mm) are provided on a holding plate, dropping the sample on the holding plate through the through-holes, and applying a laser beam to the sample. Patent Literature 2 discloses a technique for performing ionization on a sample by dropping the sample to which a matrix is added on a substrate in which a plurality of non-through-holes (in units of μm) are provided and applying a laser beam to the sample infiltrated into the non-through-holes.

CITATION LIST

Patent Literature

[Patent Literature 1] Japanese Unexamined Patent Publication No. 2014-21048
[Patent Literature 2] U.S. Pat. No. 7,695,978

SUMMARY OF INVENTION

Technical Problem

According to methods of dropping a sample on a plurality of measurement points (recesses) from above like the above techniques, continuous measurement of the sample is feasible. However, in the above techniques, in a case where a dropped amount of the sample in the recesses is too much, there is a risk of the sample overflowing out of the recesses, a so-called unevenness effect (an effect of energy of the laser beam being easily transmitted to the sample by an uneven structure) being lost, and ionization efficiency of the sample being reduced. That is, there is a risk that components in the sample may be prevented from being properly ionized or that an amount of detected ions will be reduced. As a result, there is a risk that sufficient signal intensity will not be obtained in the aforementioned mass spectrometry and the components in the sample will not be properly detected.

Therefore, the present disclosure is directed to providing a sample support body capable of performing continuous measurement on a sample while inhibiting a reduction in ionization efficiency caused by a dropped amount of the sample.

Solution to Problem

A sample support body according to an aspect of the present disclosure includes: a substrate; an ionization substrate disposed on the substrate; a support configured to support the ionization substrate with respect to the substrate such that a first surface of the ionization substrate which faces the substrate and the substrate are separated from each other; and a frame at least formed on a peripheral edge of a second surface of the ionization substrate which is located on a side opposite to the first surface when viewed in a direction in which the substrate and the ionization substrate face each other. The ionization substrate has a plurality of measurement regions for dropping a sample on the second surface. A plurality of through-holes that open in the first surface and the second surface are formed at least in the measurement regions of the ionization substrate. A conductive layer is provided on peripheral edges of the through-holes at least on the second surface. The frame has a wall provided on peripheral edges of the measurement regions on the second surface to separate the plurality of measurement regions when viewed in the direction in which the substrate and the ionization substrate face each other.

In the sample support body, a gap is formed between the first surface of the ionization substrate and the substrate by the support. Thus, even if an amount of the sample dropped on the second surface of the ionization substrate is more than a proper amount, an excess of the sample can be released to the gap between the first surface of the ionization substrate and the substrate via the through-holes provided in the ionization substrate. For this reason, the excess of the sample is inhibited from overflowing onto the second surface, and a reduction in ionization efficiency when components of the sample are ionized by applying a laser beam to the second surface is inhibited. Further, in the sample support body, the plurality of measurement regions set off by the wall of the frame are used, and thus continuous measurement of the sample can be performed. As described above, according to the sample support body, the continuous measurement of the sample can be performed while inhibiting a reduction in ionization efficiency caused by the dropped amount of the sample.

The conductive layer may be formed to further cover a surface of the frame. In this case, electrical connection for applying a voltage to the conductive layer can be performed on the frame. Thus, the electrical connection can be realized without corroding effective regions (i.e., measurement regions) on the ionization substrate.

The sample support body may further include a fixing member having conductivity and mutually fixing the ionization substrate and the substrate in contact with a portion of the conductive layer covering the surface of the frame. In this case, the substrate, the ionization substrate, and the frame can be reliably fixed to one another by the fixing member (e.g. conductive tape). Further, in the case where the substrate has conductivity, the electrical connection between the substrate and the conductive layer (the electrical connection for applying a voltage to the conductive layer) can be performed via the fixing member. Thus, a configuration for the electrical connection can be simplified.

The support may have a first support that are provided between the peripheral edges of the measurement regions on the first surface and the substrate to separate the plurality of measurement regions when viewed in the direction in which the substrate and the ionization substrate face each other. In this case, the plurality of measurement regions in the ionization substrate can be properly set off by the first support.

The first support may be a bonding member that bonds the ionization substrate and the substrate. In this case, the ionization substrate can be fixed to the substrate while the gap between the first surface of the ionization substrate and the substrate is secured by the first support.

The support may have a second support provided between a peripheral edge of the ionization substrate and the substrate. In this case, the ionization substrate can be stably supported with respect to the substrate while the gap between the first surface of the ionization substrate and the substrate is secured by the second support.

The second support may be a bonding member bonding the ionization substrate and the substrate. In this case, the ionization substrate can be fixed to the substrate while the gap between the first surface of the ionization substrate and the substrate is secured by the second support.

The substrate may be formed of a conductive slide glass or a conductive metal. In this case, electrical connection for applying a voltage to the conductive layer can be performed via the substrate. As a result, the configuration for the electrical connection can be simplified.

The ionization substrate may be formed by anodizing a valve metal or silicon. In this case, due to the anodization of the valve metal or the silicon, the ionization substrate in which the plurality of fine through-holes are provided can be realized in a proper and easy way.

Widths of the through-holes may range from 1 nm to 700 nm. In this case, the sample for ionization through application of the laser beam to the second surface can suitably remain in the through-holes while causing the excess of the sample dropped on the second surface of the ionization substrate to move to the gap between the first surface of the ionization substrate and the substrate via the through-holes.

A sample support body according to another aspect of the present disclosure includes: a substrate; an ionization substrate configured to have conductivity and disposed on the substrate; a support configured to support the ionization substrate with respect to the substrate such that a first surface of the ionization substrate which faces the substrate and the substrate are separated from each other; and a frame at least formed on a peripheral edge of a second surface of the ionization substrate which is located on a side opposite to the first surface when viewed in a direction in which the substrate and the ionization substrate face each other. The ionization substrate has a plurality of measurement regions for dropping a sample on the second surface. A plurality of through-holes that open in the first surface and the second surface are formed at least in the measurement regions of the ionization substrate. The frame has a wall provided on peripheral edges of the measurement regions on the second surface to separate the plurality of measurement regions when viewed in the direction in which the substrate and the ionization substrate face each other.

According to the sample support body, a conductive layer can be omitted in the sample support body, and like the sample support body including the conductive layer described above, continuous measurement of the sample can be performed while inhibiting a reduction in ionization efficiency caused by a dropped amount of the sample.

Advantageous Effects of Invention

According to the present disclosure, a sample support body capable of performing continuous measurement on a sample while inhibiting a reduction in ionization efficiency caused by a dropped amount of the sample can be provided.

BRIEF DESCRIPTION OF DRAWINGS

FIG. 6 is a schematic view illustrating processes of a laser desorption/ionization method according to a comparative example.

FIG. 7 is a view illustrating a sample support body according to a second embodiment.

FIG. 8 is an enlarged sectional view of major parts illustrating a schematic configuration of a portion surrounded by a broken line A illustrated in FIG. 7.

FIG. 9 is a view illustrating a sample support body according to a third embodiment.

FIG. 10 is a view illustrating sample support bodies according to fourth to sixth embodiments.

DESCRIPTION OF EMBODIMENTS

Figure 1:
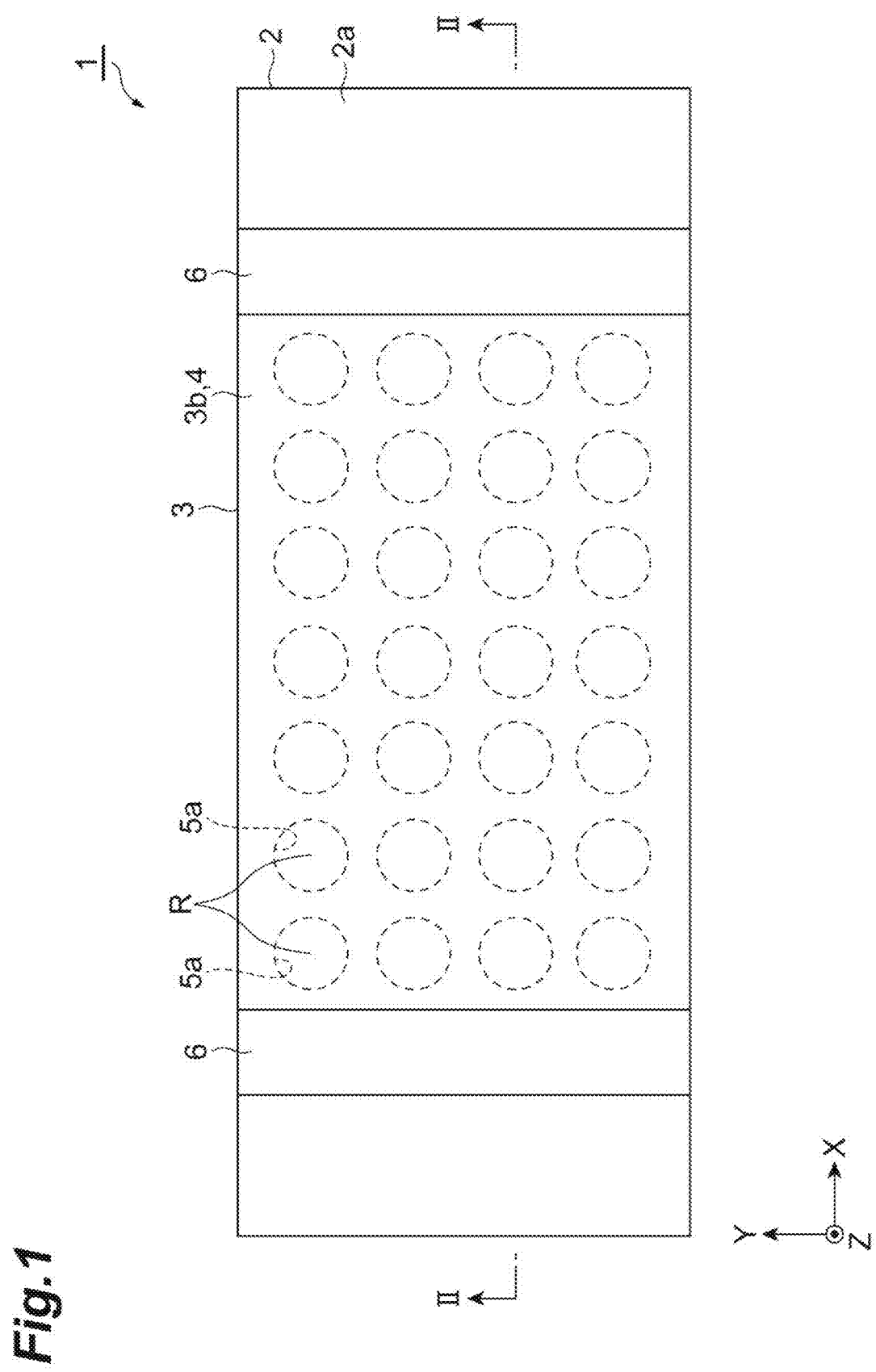
FIG. 1 is a top view of a sample support body according to a first embodiment.

Hereinafter, preferred embodiments of the present invention will be described in detail with reference to the drawings. Note that the same or equivalent portions are denoted by the same reference signs in each of the drawings, and duplicate descriptions thereof will be omitted. Dimensions of each member (or each region) illustrated in the drawings or ratios of the dimensions may be different from actual dimensions or ratios of the actual dimensions in order to facilitate understanding of the description.

First Embodiment

Figure 2:
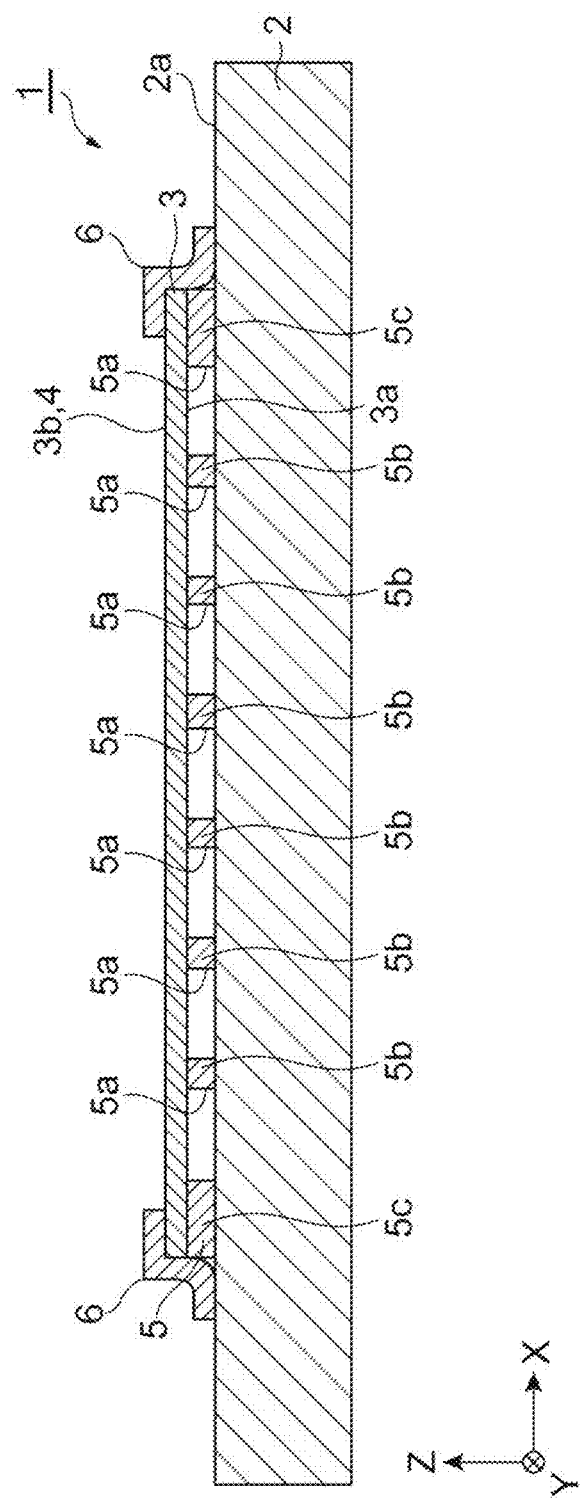
FIG. 2 is a sectional view of the sample support body along line illustrated in FIG. 1.
Figure 3:
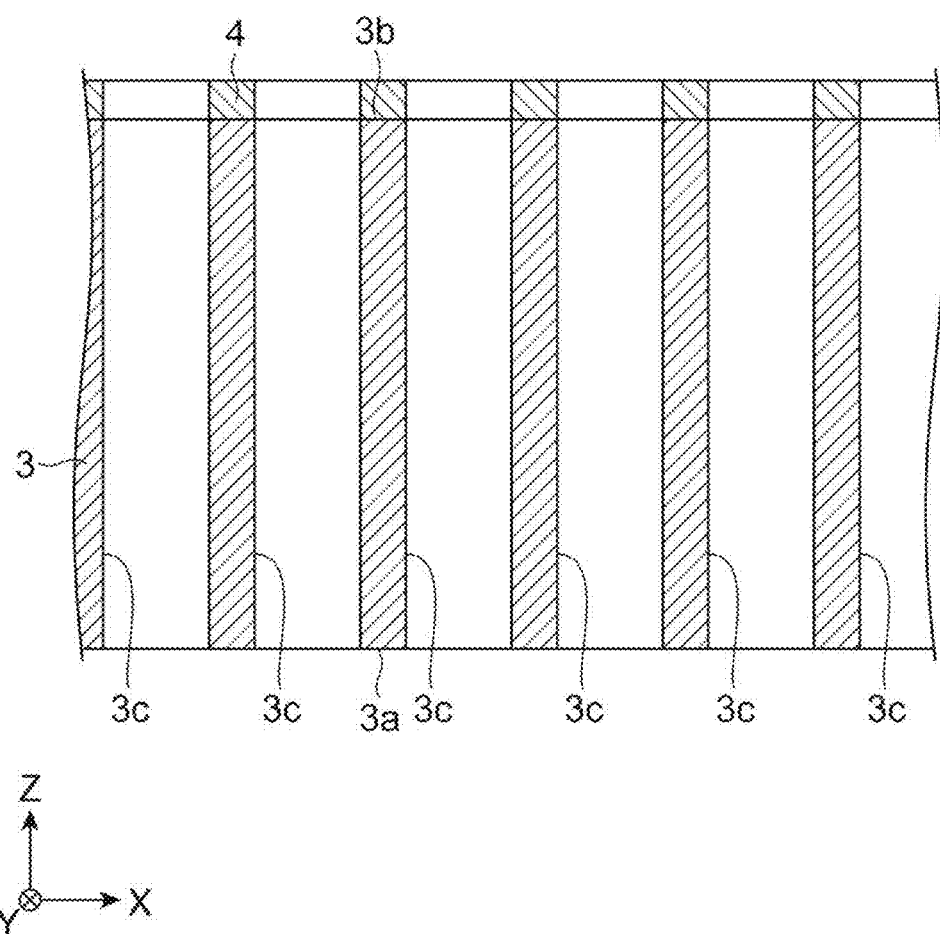
FIG. 3 is an enlarged sectional view of major parts illustrating schematic configurations of an ionization substrate and a conductive layer of the sample support body illustrated in FIG. 1.

A sample support body 1 according to a first embodiment will be described with reference to FIGS. 1 to 3. FIG. 1 is a top view of the sample support body 1. FIG. 2 is a sectional view of the sample support body 1 along line II-II illustrated in FIG. 1. FIG. 3 is an enlarged sectional view of major parts illustrating schematic configurations of an ionization substrate 3 and a conductive layer 4 of the sample support body 1. As illustrated in FIGS. 1 to 3, the sample support body 1 includes a substrate 2, an ionization substrate 3, a conductive layer 4, a support 5, and tapes (fixing members) 6. The substrate 2 is formed, for instance, in a rectangular plate shape. Hereinafter, for convenience, a direction parallel to long sides of the substrate 2 may be referred to as an X direction, a direction parallel to short sides of the substrate 2 may be referred to as a Y direction, and a thickness direction of the substrate 2 may be referred to as a Z direction. The Z direction is also a direction in which the substrate 2 and the ionization substrate 3 face each other.

The substrate 2 is formed of, for instance, a conductive material. For example, the substrate 2 is formed of a slide glass, a metal, etc. having conductivity. The slide glass having conductivity is, for instance, a glass substrate on which a transparent conductive film such as an ITO film is formed (an indium tin oxide (ITO) slide glass). Lengths of the short and long sides of the substrate 2 are, for instance, around a few centimeters. A thickness of the substrate 2 is, for instance, about 1 mm. When the sample support body 1 is placed on a sample stage (a stage) of a mass spectrometry device (not illustrated), the substrate 2 is a portion that comes into contact with the sample stage.

The ionization substrate 3 is formed of, for instance, an insulating material in a rectangular plate shape. The ionization substrate 3 can be formed, for instance, by anodizing a valve metal or silicon. In the present embodiment, lengths of short sides (sides parallel to the Y direction) of the ionization substrate 3 are the same as those of the short sides of the substrate 2, and lengths of long sides (sides parallel to the X direction) of the ionization substrate 3 are set to be shorter than those of the long sides of the substrate 2. A thickness of the ionization substrate 3 is, for instance, about 1 μm to 50 μm. The ionization substrate 3 is disposed above the substrate 2, and has a first surface 3a that faces the substrate 2 and a second surface 3b that is located on a side opposite to the first surface 3a. When viewed in the Z direction, the ionization substrate 3 is disposed above the substrate 2 such that the long sides of the ionization substrate 3 overlap those of the substrate 2, and the center of the ionization substrate 3 overlaps that of the substrate 2.

As illustrated in FIG. 1, the ionization substrate 3 has a plurality of measurement regions R for dropping a sample on the second surface 3b. A shape of each of the measurement regions R is, for instance, a circular shape whose diameter is around a few millimeters (e.g., 3 mm). In the present embodiment, the ionization substrate 3 has seven measurement regions R disposed at regular intervals in the X direction, and four measurement regions R disposed at regular intervals in the Y direction. A mark or the like for an operator to identify each of the measurement regions R may be added to the ionization substrate 3, but these marks or the like may not be added. That is, the second surface 3b of the ionization substrate 3 may have regions that can be large enough to set the plurality of measurement regions R. In this case, the measurement regions R are set off by members other than the ionization substrate 3 such as, for instance, first support 5b to be described below, and thus the measurement regions R can be identified by an operator who performs measurement using the sample support body 1.

As illustrated in FIG. 3, a plurality of through-holes 3c are formed uniformly (with a uniform distribution) at least in the measurement regions R of the ionization substrate 3. In the present embodiment, the plurality of through-holes 3c are uniformly formed in the entire second surface 3b of the ionization substrate 3. Each of the through-holes 3c extends in the Z direction (the direction perpendicular to the first and second surfaces 3a and 3b), and opens in the first and second surfaces 3a and 3b. Shapes of the through-holes 3c when viewed in the Z direction are, for instance, approximately circular shapes. Widths of the through-holes 3c are, for instance, about 1 nm to 700 nm. The widths of the through-holes 3c are diameters of the through-holes 3c in the case where the shapes of the through-holes 3c when viewed in the Z direction are, for instance, approximately circular shapes, and are diameters (effective diameters) of imaginary maximum columns fitted into the through-holes 3c in the case where the shapes of the through-holes 3c are shapes other than the approximately circular shapes.

Figure 4:
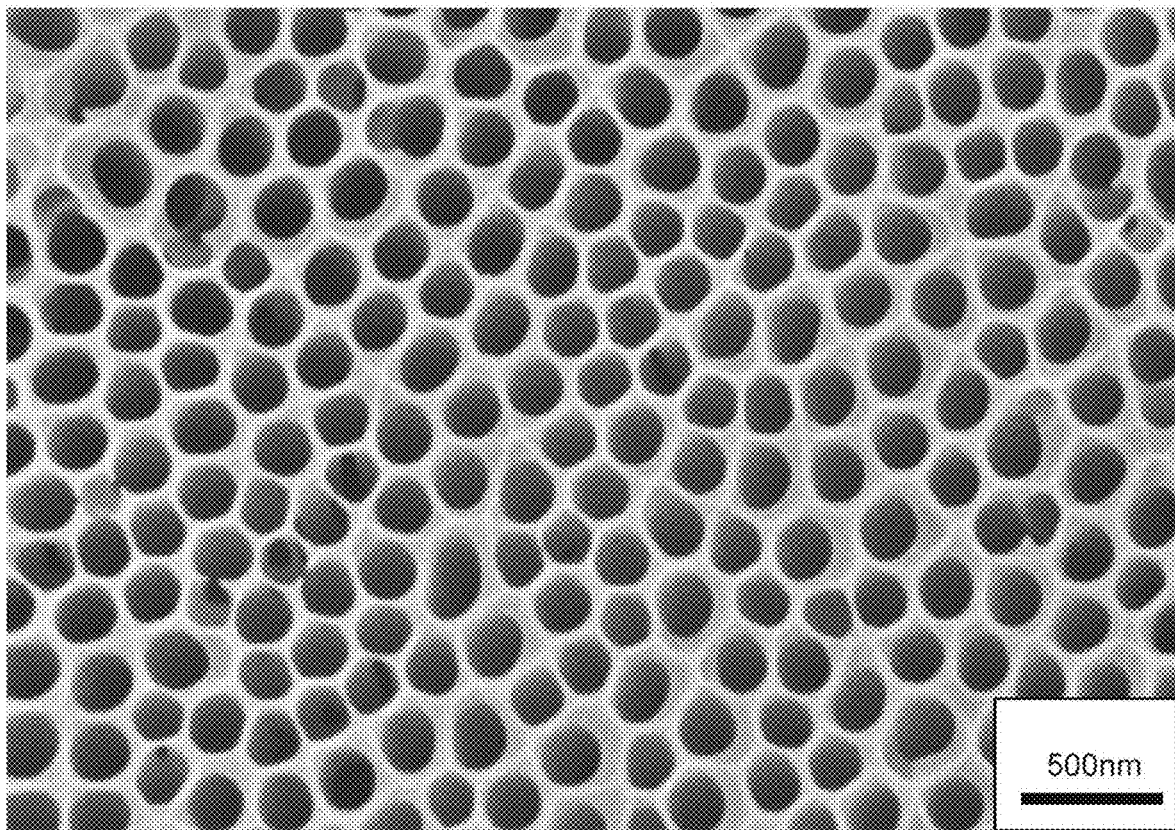
FIG. 4 is a view illustrating an enlarged image of the ionization substrate of the sample support body illustrated in FIG. 1.

FIG. 4 is a view illustrating an enlarged image of the ionization substrate 3 when viewed in the thickness direction of the ionization substrate 3. In FIG. 4, black portions are equivalent to the through-holes 3c, and white portions are equivalent to partitions between the through-holes 3c. As illustrated in FIG. 4, the plurality of through-holes 3c having approximately a constant width are uniformly formed in the ionization substrate 3. An opening ratio of the through-holes 3c in the measurement regions R (a ratio of the whole through-holes 3c to the measurement regions R when viewed in the thickness direction of the ionization substrate 3) is practically 10 to 80%, and particularly preferably 60 to 80%. Sizes of the plurality of through-holes 3c may be irregular, and the plurality of through-holes 3c may be partly coupled to one another.

The ionization substrate 3 illustrated in FIG. 4 is an alumina porous film formed by anodizing aluminum (Al). To be specific, the ionization substrate 3 can be obtained by performing anodization treatment on an Al substrate and peeling an oxidized surface portion from the Al substrate. The ionization substrate 3 may be formed by anodizing a valve metal other than Al such as tantalum (Ta), niobium (Nb), titanium (Ti), hafnium (Hf), zirconium (Zr), zinc (Zn), tungsten (W), bismuth (Bi), antimony (Sb), or the like, or by anodizing silicon (Si).

The conductive layer 4 is a layer formed of a conductive material provided to impart conductivity to the insulating ionization substrate 3. However, even in the case where the ionization substrate 3 is formed of a conductive material, providing the conductive layer 4 is not obstructed. The conductive layer 4 is at least provided at peripheral edges of the through-holes 3c on the second surface 3b. As illustrated in FIG. 3, the conductive layer 4 covers a portion of the second surface 3b at which the through-holes 3c are not formed. That is, openings of the through-holes 3c which are adjacent to the second surface 3b are not blocked by the conductive layer 4.

A metal having a low affinity (reactivity) with a sample and high conductivity is preferably used as the material of the conductive layer 4 due to reasons that will be mentioned below. For example, when the conductive layer 4 is formed of a metal such as copper (Cu) having a high affinity with a sample such as a protein, there is a risk of the sample being ionized with Cu atoms attached to sample molecules in a process of ionizing the sample to be described below, and of a detected result in a mass spectrometry method to be described below deviating in proportion as the Cu atoms are attached. Therefore, a metal having a low affinity with a sample is preferably used as the material of the conductive layer 4.

Meanwhile, as the conductivity of a metal becomes higher, a constant voltage is easily applied in an easier and more stable way. For this reason, when the conductive layer 4 is formed of a metal having high conductivity, a voltage can be uniformly applied to the second surface 3b of the ionization substrate 3 in the measurement regions R. Further, a metal having higher conductivity also shows a tendency to have higher thermal conductivity. For this reason, when the conductive layer 4 is framed of a metal having high conductivity, energy of a laser beam applied to the ionization substrate 3 can be efficiently transmitted to a sample via the conductive layer 4. Therefore, a metal having high conductivity is preferably used as the material of the conductive layer 4.

In view of this, for example, gold (Au), platinum (Pt), or the like is preferably used as the material of the conductive layer 4. For example, the conductive layer 4 is formed at a thickness of about 1 nm to 350 nm by a plating method, an atomic layer deposition (ALD) method, a vapor deposition method, a sputtering method, or the like. For example, chromium (Cr), nickel (Ni), titanium (Ti), or the like may be used as the material of the conductive layer 4.

The support 5 is a member that supports the ionization substrate 3 with respect to the substrate 2 such that the first surface 3a of the ionization substrate 3 and the substrate 2 are separated from each other. The support 5 functions as a gap forming member for forming a gap between the first surface 3a of the ionization substrate 3 and a surface 2a of the substrate 2 which faces the ionization substrate 3. In the present embodiment, when viewed in the Z direction, a contour of the support 5 has a rectangular plate shape having nearly the same size as the ionization substrate 3. Further, a thickness of the support 5 is, for instance, about 40 μm.

When viewed in the Z direction, through-holes 5a having shapes corresponding to the measurement regions R (here, circular shapes having a diameter of 3 mm) are formed in portions of the support 5 which overlap the plurality of measurement regions R. That is, when viewed in the Z direction, the support 5 has a first support 5b (peripheral edge portions of the through-holes 5a) provided between peripheral edges of the measurement regions R on the first surface 3a and the substrate 2 to separate the plurality of measurement regions R. Further, the support 5 also has a second support 5c (a portion that overlaps a peripheral edge of the ionization substrate 3) provided between the peripheral edge of the ionization substrate 3 (when viewed in the Z direction, a portion located outside regions in which the plurality of measurement regions R are provided) and the substrate 2.

The first support 5b is a portion that is equivalent to partitions between the plurality of through-holes 5a, and is foil led to regulate the plurality of measurement regions R. The first support 5b is formed of, for instance, a bonding member that bonds the first surface 3a of the ionization substrate 3 and the surface 2a of the substrate 2. To be specific, the first support 5b is, for instance, a conductive double-sided tape, a conductive vacuum adhesive, or the like. According to the first support 5b, the ionization substrate 3 can be fixed to the surface 2a of the substrate 2 while a gap between the first surface 3a of the ionization substrate 3 and the surface 2a of the substrate 2 is secured. Here, the plurality of through-holes 3c are provided in the ionization substrate 3, and the ionization substrate 3 and the conductive layer 4 are very thin. For this reason, when the sample support body 1 is seen from the vicinity of the second surface 3b of the ionization substrate 3, boundaries of the through-holes 5a and the first support 5b are seen. Thus, an operator who performs measurement using the sample support body 1 can visually recognize each of the measurement regions R. In addition, according to the first support 5b, an excess of the sample dropped on one of the measurement regions R can be prevented from moving to other measurement regions R via the gap between the first surface 3a of the ionization substrate 3 and the surface 2a of the substrate 2 (i.e., the samples dropped on the different measurement regions can be prevented from mixing with each other).

The second support 5c is a portion that is equivalent to an outer circumferential frame of the support 5, and is formed to surround the plurality of measurement regions R. According to the second support 5c, the ionization substrate 3 can be stably supported with respect to the substrate 2 while the gap between the first surface 3a of the ionization substrate 3 and the surface 2a of the substrate 2 is secured. The second support 5c is formed of, for instance, a bonding member that bonds the first surface 3a of the ionization substrate 3 and the surface 2a of the substrate 2. To be specific, the second support 5c is, for instance, a conductive double-sided tape, a conductive vacuum adhesive, or the like. In this case, the ionization substrate 3 can be fixed to the surface 2a of the substrate 2 by the second support 5c.

The tapes 6 are members that have conductivity and fix edges along the short sides of the ionization substrate 3 to the substrate 2. The tapes 6 function as fixing members that fix the ionization substrate 3 and the substrate 2 to each other in contact with the conductive layer 4. As illustrated in FIG. 2, in the present embodiment, the tapes 6 are bonded to the conductive layer 4 (here, the portion that covers an upper surface of the edges along the short sides of the second surface 3b of the ionization substrate 3) and the surface 2a of the substrate 2 to press the ionization substrate 3 against the substrate 2. The ionization substrate 3 can be reliably fixed to the substrate 2 by the tapes 6. Further, in a case where the substrate 2 has conductivity, electrical connection between the substrate 2 and the conductive layer 4 (electrical connection for applying a voltage to the conductive layer 4) can be performed via the tapes 6. Thus, a configuration for the above electrical connection can be simplified.

Figure 5:
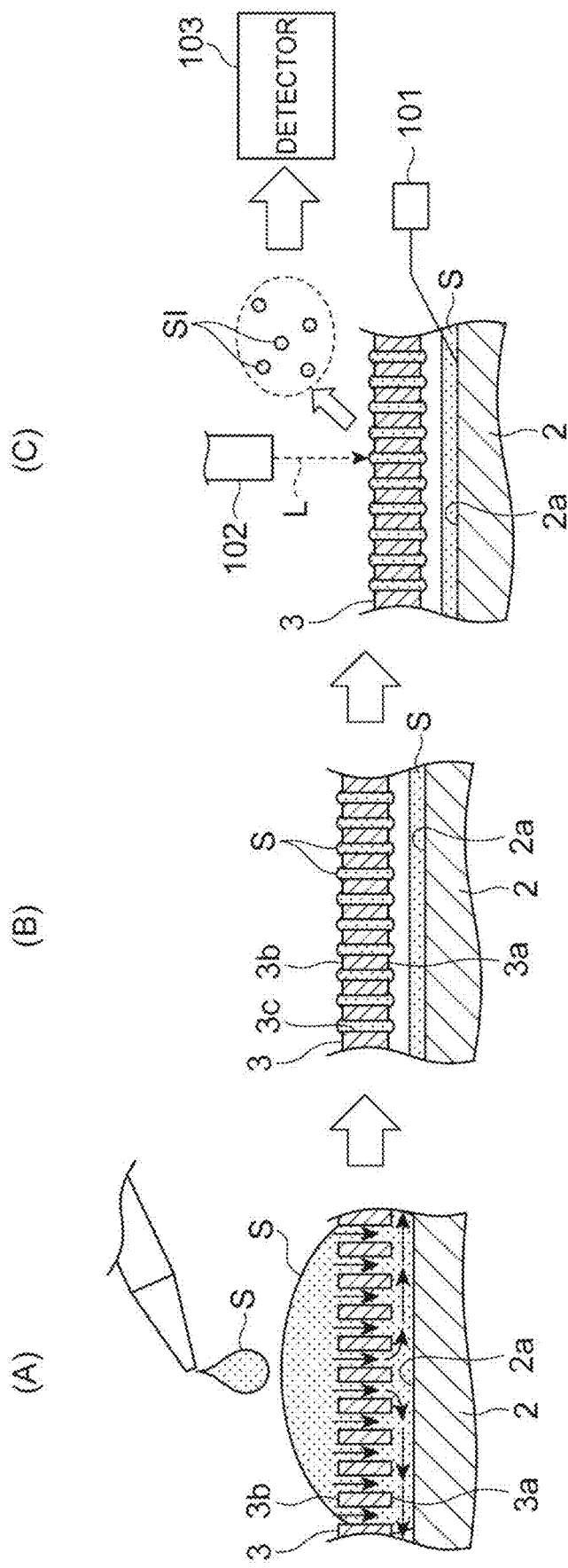
FIG. 5 is a schematic view illustrating processes of a mass spectrometry method according to an embodiment.

Next, a mass spectrometry method (including a laser desorption/ionization method) using the sample support body 1 will be described. FIG. 5 is a schematic view illustrating processes of a mass spectrometry method according to the present embodiment. In FIG. 5, the conductive layer 4 is not illustrated.

First, the aforementioned sample support body 1 is prepared (a first process). The sample support body 1 is manufactured by a person who performs the mass spectrometry method or is obtained from a manufacturer or a seller thereof, and thereby the sample support body 1 may be prepared.

Next, as illustrated in FIG. 5(A), a sample S is dropped on one of the measurement regions R in the ionization substrate 3 (a second process). Here, a gap is formed between the first surface 3a of the ionization substrate 3 and the surface 2a of the substrate 2 by the aforementioned support 5. For this reason, in a case where an amount of the sample S dropped on the second surface 3b of the ionization substrate 3 is more than a proper amount, an excess of the sample S is made to flow into the gap between the first surface 3a of the ionization substrate 3 and the surface 2a of the substrate 2 via the through-holes 3c provided in the ionization substrate 3 due to gravity. On the other hand, because widths of the through-holes 3c are extremely small, ranging from 1 nm to 700 nm, the sample S ionized by applying a laser beam to the second surface 3b can be suitably maintained in the through-holes 3c. Thus, as illustrated in FIG. 5(B), after the sample S has infiltrated into the ionization substrate 3 (after the sample S is dried), the excess of the sample S is released into the gap between the first surface 3a of the ionization substrate 3 and the surface 2a of the substrate 2, whereas a proper amount of the sample S required for ionization remains in the through-holes 3c.

Next, the sample support body 1 and the sample S are placed, for instance, on a stage of a mass spectrometry device (not illustrated). Then, as illustrated in FIG. 5(C), a voltage is applied to the conductive layer 4 (see FIG. 2) of the sample support body 1 via the surface 2a of the substrate 2 and the tapes 6 (see FIG. 2) by a voltage application unit 101 of the mass spectrometry device (a third process). Then, a laser beam L is applied to the second surface 3b of the ionization substrate 3 by a laser beam emission unit 102 of the mass spectrometry device (the third process). That is, the laser beam L is applied to the measurement region R on which the sample S is dropped.

In this way, the laser beam L is applied to the second surface 3b of the ionization substrate 3 while the voltage is applied to the conductive layer 4. Thus, components of the sample S (especially, the sample S around the opening of the through-hole 3c which is located adjacent to the second surface 3b) that remains in the through-hole 3c formed in the ionization substrate 3 are ionized, and sample ions SI (the ionized components) are discharged (a fourth process). To be specific, energy is transmitted to the components of the sample S that remains in the through-hole 3c fixated in the ionization substrate 3 from the conductive layer 4 (see FIG. 3) that absorbs energy of the laser beam L, the components obtaining the energy evaporate, and charges are obtained to become the sample ions SI. The above first to fourth processes correspond to the laser desorption/ionization method using the sample support body 1.

The discharged sample ions SI move toward a ground electrode (not illustrated) provided between the sample support body 1 and a detector 103 of the mass spectrometry device while accelerating. That is, the sample ions SI move toward the ground electrode due to a potential difference generated between the conductive layer 4 to which the voltage is applied and the ground electrode while accelerating. Then, the sample ions SI are detected by the detector 103 (a fifth process). Here, the mass spectrometry device uses a time-of-flight mass spectrometry (TOF-MS) method. The above first to fifth processes correspond to the mass spectrometry method using the sample support body 1.

FIG. 6 is a schematic view illustrating processes of a laser desorption/ionization method according to a comparative example. To be specific, FIG. 6 illustrates an outline of a conventional surface-assisted laser desorption/ionization (SALDI) method. In the laser desorption/ionization method according to the comparative example, a substrate 300 having a fine uneven structure on a surface thereof is used. To be specific, first, a sample S is dropped on one measurement spot of the substrate 300 (a surface on which the uneven structure of the substrate 300 is provided) (FIG. 6(A)). Here, a space for releasing an excess of the sample S is not provided in the substrate 300, like the sample support body 1. For this reason, in a case where a dropped amount of the sample S is more than a proper amount, after the sample S infiltrates into the surface of the substrate 300 (after the sample S is dried), the excess of the sample S overflows out of the uneven structure of the substrate 300 (i.e., the uneven structure is buried in the sample S) (FIG. 6(B)). For this reason, a so-called unevenness effect (an effect of energy of the laser beam being easily transmitted to the sample by the uneven structure) is not produced, and ionization efficiency of the sample S when a laser beam is applied to the surface of the substrate 300 is reduced (FIG. 6(C)). On the other hand, as described above, according to the laser desorption/ionization method using the sample support body 1, since the excess of the sample S is prevented from overflowing onto the second surface 3b of the ionization substrate 3, a reduction in the ionization efficiency of the sample S can be inhibited.

As described above, in the sample support body 1, the gap is formed between the first surface 3a of the ionization substrate 3 and the substrate 2 by the support 5. Thus, even if the amount of the sample S dropped on the second surface 3b of the ionization substrate 3 is more than a proper amount, the excess of the sample S can be released into the gap between the first surface 3a of the ionization substrate 3 and the substrate 2 via the through-holes 3c provided in the ionization substrate 3. For this reason, the excess of the sample S is inhibited from overflowing onto the second surface 3b, and the reduction in ionization efficiency when the components of the sample S are ionized by applying the laser beam L to the second surface 3b is inhibited. Further, in the sample support body 1, the plurality of measurement regions R set off by the first support 5b are used, and thus the continuous measurement of the sample S can be performed. As described above, according to the sample support body 1, the continuous measurement of the sample S can be performed while inhibiting the reduction in ionization efficiency caused by the dropped amount of the sample S.

Further, since the substrate 2 is formed of a conductive slide glass or a conductive metal, the electrical connection for applying a voltage to the conductive layer 4 can be performed via the substrate 2. As a result, the configuration for the electrical connection can be simplified.

Further, the ionization substrate 3 is formed by anodizing a valve metal or silicon. In this case, due to the anodization of the valve metal or the silicon, the ionization substrate 3 in which the plurality of fine through-holes 3c are provided can be realized in a proper and easy way.

Further, the widths of the through-holes 3c range from 1 nm to 700 nm. Thus, the sample S for ionization through application of the laser beam L to the second surface 3b can suitably remain in the through-hole 3c while the excess of the sample S dropped on the second surface 3b of the ionization substrate 3 is caused to move to the gap between the first surface 3a of the ionization substrate 3 and the substrate 2 via the through-hole 3c.

Further, the sample support body 1 includes the tapes 6 that have conductivity and fix the ionization substrate 3 and the substrate 2 in contact with the conductive layer 4. For this reason, the ionization substrate 3 can be reliably fixed to the substrate 2 by the tapes 6. Further, in the case where the substrate 2 has conductivity, the electrical connection between the substrate 2 and the conductive layer 4 (the electrical connection for applying a voltage to the conductive layer 4) can be performed via the tapes 6. Thus, the configuration for the electrical connection can be simplified.

Further, in the sample support body 1 prepared in the first process of the aforementioned laser desorption/ionization method, the gap is formed between the first surface 3a of the ionization substrate 3 and the substrate 2 by the support 5. Thus, even if the amount of the sample S dropped on the second surface 3b of the ionization substrate 3 is more than a proper amount in the second process, the excess of the sample S can be released to the gap between the first surface 3a of the ionization substrate 3 and the substrate 2 via the through-hole 3c provided in the ionization substrate 3. For this reason, the excess of the sample S is inhibited from overflowing onto the second surface 3b. As a result, the reduction in ionization efficiency when the components of the sample S are ionized by applying the laser beam L to the second surface 3b is inhibited in the third process. As described above, according to the laser desorption/ionization method, the reduction in ionization efficiency caused by the dropped amount of the sample can be inhibited.

The ionization substrate 3 and the substrate 2 may be individually prepared in the sample support body 1. For example, the ionization substrate 3 on which the support 5 and the tapes 6 are provided may be a member that is distributed independently of the substrate 2. In this case, for example, an operator or the like fixes the ionization substrate 3 (i.e., the ionization substrate 3 including the support 5 and the tapes 6) to the surface 2a of the substrate 2, and thus the aforementioned sample support body 1 is obtained.

Second Embodiment

A sample support body 1A according to a second embodiment will be described with reference to FIGS. 7 and 8. FIG. 7A is a top view of the sample support body 1A. FIG. 7B is a sectional view of the sample support body 1A along line B-B of FIG. 7A. FIG. 8 is an enlarged sectional view of major parts illustrating a schematic configuration of a portion surrounded by a broken line A illustrated in FIG. 7. As illustrated in FIGS. 7 and 8, the sample support body 1A is different from the sample support body 1 in that the sample support body 1A includes a frame 7 and disposition of a conductive layer 4 and tapes 6 is partly changed, and the other configurations are the same as in the sample support body 1.

When viewed in a direction in which a substrate 2 and an ionization substrate 3 face each other (a Z direction), the frame 7 is at least formed on a peripheral edge of a second surface 3b in the ionization substrate 3. In the present embodiment, when viewed in the Z direction, a contour of the frame 7 has a rectangular plate shape having nearly the same size as the ionization substrate 3. Further, a thickness of the frame 7 is, for instance, 1 mm or less. The frame 7 is formed of, for instance, a metal.

When viewed in the Z direction, through-holes 7a having shapes corresponding to a plurality of measurement regions R (here, circular shapes having a diameter of 3 mm) are formed in portions of the frame 7 which overlap the plurality of measurement regions R. That is, when viewed in the Z direction, the frame 7 has a wall 7b (peripheral edge portions of the through-holes 7a) provided on peripheral edges of the measurement regions R on the second surface 3b to separate the plurality of measurement regions R. Further, the frame 7 also has an outer edge 7c (a portion that overlaps a peripheral edge of the ionization substrate 3) provided on the peripheral edge of the second surface 3b of the ionization substrate 3 (when viewed in the Z direction, a portion located outside regions in which the plurality of measurement regions R are provided).

The wall 7b is a portion that corresponds to partitions between the plurality of through-holes 7a, and is formed to regulate the plurality of measurement regions R. Thus, an operator who performs measurement using the sample support body 1 can visually recognize each of the measurement regions R. Further, according to the wall 7b, for example, when a sample is dropped on one of the measurement regions R, a part of the sample can be prevented from being scattered to other measurement regions R adjacent to one of the measurement regions R. The outer edge 7c is a portion that correspond to an outer circumferential frame of the frame 7 having a rectangular plate shape, and is formed to surround the plurality of measurement regions R.

As illustrated in FIG. 8, the frame 7 (the wall 7b and the outer edge 7c) is fixed to the second surface 3b of the ionization substrate 3 by an adhesive layer 8. An adhesive material that emits little gas (e.g., low melting point glass, an adhesive for vacuum, or the like) is preferably used as a material of the adhesive layer 8. Further, in the sample support body 1A, the conductive layer 4 is continuously (integrally) formed on regions of the second surface 3b of the ionization substrate 3 (i.e., the measurement regions R) which correspond to the openings (the through-holes 7a) of the frame 7, inner surfaces of the through-holes 7a, and a surface 7d of the frame 7 which is located on a side opposite to the ionization substrate 3. That is, the conductive layer 4 is formed to further cover the surface 7d of the frame 7. Thus, as will be described below, electrical connection for applying a voltage to the conductive layer 4 can be performed on the frame 7. In the measurement regions R, like the sample support body 1, the conductive layer 4 covers a portion of the second surface 3b at which the through-holes 3c are not formed. That is, openings of the through-holes 3c which are adjacent to the second surface 3b are not blocked by the conductive layer 4.

Further, in the sample support body 1A, the tapes 6 function as fixing members that fix the ionization substrate 3 and the substrate 2 to each other in contact with a portion of the conductive layer 4 which covers the surface 7d of the frame 7. To be specific, the tapes 6 are bonded to the conductive layer 4 (here, the portion that covers the surface 7d) and a surface 2a of the substrate 2 to press the ionization substrate 3 against the substrate 2 from the top of the outer edge 7c of the frame 7. The substrate 2, the ionization substrate 3, and the frame 7 can be reliably fixed to one another by the tapes 6. Further, in a case where the substrate 2 has conductivity, the electrical connection between the substrate 2 and the conductive layer 4 (the electrical connection for applying a voltage to the conductive layer 4) can be performed via the tapes 6. Thus, a configuration for the above electrical connection can be simplified. Especially, since the electrical connection can be performed on the surface 7d of the frame 7, the electrical connection can be realized without corroding the effective regions (i.e., the measurement regions R) on the ionization substrate 3.

In the sample support body 1A, like the sample support body 1, a gap is formed between the first surface 3a of the ionization substrate 3 and the substrate 2 by a support 5. Thus, even if an amount of the sample S dropped on the second surface 3b of the ionization substrate 3 is more than a proper amount, an excess of the sample S can be released to the gap between the first surface 3a of the ionization substrate 3 and the substrate 2 via the through-holes 3c provided in the ionization substrate 3. For this reason, the excess of the sample S is inhibited from overflowing out on the second surface 3b, and a reduction in ionization efficiency when components of the sample S are ionized by applying a laser beam L to the second surface 3b is inhibited. Further, in the sample support body 1A, the plurality of measurement regions R set off by the wall 7b of the frame 7 are used, and thus continuous measurement of the sample S can be performed. As described above, according to the sample support body 1A, the continuous measurement of the sample S can be performed while inhibiting the reduction in ionization efficiency caused by the dropped amount of the sample S.

The ionization substrate 3 and the substrate 2 may be individually prepared in the sample support body 1A. For example, the ionization substrate 3 on which the support 5, the tapes 6, and the frame 7 are provided may be a member that is distributed independently of the substrate 2. In this case, for example, an operator or the like fixes the ionization substrate 3 (i.e., the ionization substrate 3 including the support 5, the tapes 6, and the frame 7) to the surface 2a of the substrate 2, and thus the aforementioned sample support body 1A is obtained.

Third Embodiment

A sample support body 1B according to a third embodiment will be described with reference to FIG. 9. FIG. 9(A) is a top view of the sample support body 1B. FIG. 9(B) is a sectional view of the sample support body 1B (a top view of a substrate 12) along line B-B of FIG. 9(A). As illustrated in FIG. 9, the sample support body 1B is different from the sample support body 1 in that the sample support body 1B includes the substrate 12 instead of the substrate 2, and the other configurations are the same as in the sample support body 1.

A plurality of through-holes 12a extending in a direction (a Z direction) in which the substrate 12 and an ionization substrate 3 face each other are provided in the substrate 12 to correspond to a plurality of measurement regions R. In the present embodiment, when viewed in the Z direction, each of the through-holes 12a has a circular shape having the same size as each of the corresponding measurement regions R. That is, when viewed in the Z direction, the through-holes 12a overlap corresponding through-holes 5a of a support 5. However, when viewed in the Z direction, the through-holes 12a may not necessarily completely overlap the corresponding measurement regions R and through-holes 5a. Further, contours of the through-holes 12a viewed in the Z direction may not necessarily be identical to those (here, circular shapes having a diameter of 3 mm) of the corresponding measurement regions R and through-holes 5a. That is, the contours of the through-holes 12a viewed in the Z direction may be smaller or larger than those of the corresponding measurement regions R and through-holes 5a.

In the sample support body 1B, at least a part of the substrate 12 which is adjacent to the ionization substrate 3 is formed to enable a sample S to be moved inside the substrate 12. To be specific, the plurality of through-holes 12a are formed in the substrate 12. For this reason, the sample S overflowing out of openings of through-holes 3c which are adjacent to a first surface 3a of the ionization substrate 3 toward the substrate 12 can be moved into the through-holes 12a of the substrate 12. That is, an excess of the sample S can be released to the through-holes 12a provided in the substrate 12 to correspond to the measurement regions R. Thus, even if an amount of the sample S dropped on a second surface 3b of the ionization substrate 3 is more than a proper amount, the excess of the sample S flowing into the substrate 12 via the through-holes 3c provided in the ionization substrate 3 can be released inside the substrate 12 (here, inner portions of the through-holes 12a). For this reason, the excess of the sample S is inhibited from overflowing out on the second surface 3b, and a reduction in ionization efficiency when components of the sample S are ionized by applying a laser beam L to the second surface 3b is inhibited. As described above, according to the sample support body 1B, the reduction in ionization efficiency caused by the dropped amount of the sample S can be inhibited. Further, in the sample support body 1B, the plurality of measurement regions R prepared on the second surface 3b of the ionization substrate 3 are used, and thus continuous measurement of the sample S can be performed.

Further, in the sample support body 1B, since the excess of the sample S can be released outside the substrate 12 (a side opposite to the vicinity of the ionization substrate 3) via the through-holes 12a formed in the substrate 12, the excess of the sample S can be more effectively discharged.

Further, in a case where the sample support body 1B is used instead of the sample support body 1 in the aforementioned laser desorption/ionization method, even if the amount of the sample S dropped on the second surface 3b of the ionization substrate 3 is more than a proper amount in the second process, the excess of the sample S flowing into the substrate 12 via the through-holes 3c provided in the ionization substrate 3 can be released inside the substrate 12 (here, the inner portions of the through-holes 12a). For this reason, the excess of the sample S is inhibited from overflowing out on the second surface 3b. As a result, the reduction in ionization efficiency when the components of the sample S are ionized by applying the laser beam L to the second surface 3b is inhibited in the third process. As described above, according to the laser desorption/ionization method using the sample support body 1B, the reduction in ionization efficiency caused by the dropped amount of the sample S can be inhibited.

The ionization substrate 3 and the substrate 12 may be individually prepared in the sample support body 1B. For example, the ionization substrate 3 on which the support 5 and tapes 6 are provided may be a member that is distributed independently of the substrate 12. In this case, for example, an operator or the like fixes the ionization substrate 3 (i.e., the ionization substrate 3 including the support 5 and the tapes 6) to a surface of the substrate 12, and thus the aforementioned sample support body 1B is obtained.

Fourth Embodiment

FIG. 10(A) is a view illustrating a sample support body 1C according to a fourth embodiment. The sample support body 1C is different from the sample support body 1B in that the sample support body 1C includes a substrate 22 instead of the substrate 12, and the other configurations are the same as in the sample support body 1B.

A plurality of recesses 22b are provided in a surface 22a of the substrate 22 which is adjacent to an ionization substrate 3 to correspond to a plurality of measurement regions R. In the present embodiment, when viewed in a Z direction, openings of the recesses 22b have circular shapes having the same size as the corresponding measurement regions R. That is, when viewed in the Z direction, the recesses 22b overlap corresponding through-holes 5a of a support 5. However, when viewed in the Z direction, the recesses 22b may not necessarily completely overlap the corresponding measurement regions R and through-holes 5a. Further, contours of the recesses 22b viewed in the Z direction may not necessarily be identical to those (here, circular shapes having a diameter of 3 mm) of the corresponding measurement regions R and through-holes 5a. That is, the contours of the recesses 22b viewed in the Z direction may be smaller or larger than those of the corresponding measurement regions R and through-holes 5a.

Like the sample support body 1B, in the sample support body 1C, at least a part of the substrate 22 which is adjacent to the ionization substrate 3 is also formed to enable a sample S to be moved inside the substrate 22. To be specific, the plurality of recesses 22b are formed in the surface 22a of the substrate 22 which faces the ionization substrate 3. For this reason, the sample S overflowing out of openings of through-holes 3c which are adjacent to a first surface 3a of the ionization substrate 3 toward the substrate 22 can be moved into the recesses 22b of the substrate 22. That is, an excess of the sample S can be released to the recesses 22b provided in the substrate 22 to correspond to the measurement regions R. Thus, the same effects as the aforementioned sample support body 1B are obtained.

The ionization substrate 3 and the substrate 22 may be individually prepared in the sample support body 1C. For example, the ionization substrate 3 on which the support 5 and tapes 6 are provided may be a member that is distributed independently of the substrate 22. In this case, for example, an operator or the like fixes the ionization substrate 3 (i.e., the ionization substrate 3 including the support 5 and the tapes 6) to the surface 22a of the substrate 22, and thus the aforementioned sample support body 1C is obtained.

Fifth Embodiment

FIG. 10(B) is a view illustrating a sample support body 1D according to a fifth embodiment. The sample support body 1D is different from the sample support body 1B in that the sample support body 1D includes a substrate 32 instead of the substrate 12, and the other configurations are the same as in the sample support body 1B.

Like the sample support body 1B, in the sample support body 1D, at least a part of the substrate 32 which is adjacent to an ionization substrate 3 is formed to enable a sample S to be moved inside the substrate 32. To be specific, the substrate 32 is formed of a material having absorbency. The substrate 32 is formed of, for instance, a resin such as urethane, a porous metal, a ceramic, or the like. For this reason, the sample S reaching the substrate 32 via through-holes 3c of the ionization substrate 3 is absorbed into the substrate 32, and thereby the excess of the sample S can be released inside the substrate 32. Thus, the same effects as the aforementioned sample support bodies 1B and 1C are obtained.

The ionization substrate 3 and the substrate 32 may be individually prepared in the sample support body 1D. For example, the ionization substrate 3 on which a support 5 and tapes 6 are provided may be a member that is distributed independently of the substrate 32. In this case, for example, an operator or the like fixes the ionization substrate 3 (i.e., the ionization substrate 3 including the support 5 and the tapes 6) to a surface of the substrate 32, and thus the aforementioned sample support body 1D is obtained.

Sixth Embodiment

FIG. 10(C) is a view illustrating a sample support body 1E according to a sixth embodiment. The sample support body 1E is different from the sample support body 1B in that the sample support body 1E does not include a support 5 and a first surface 3a of an ionization substrate 3 is in contact with a surface of a substrate 12, and the other configurations are the same as in the sample support body 1B. The support 5 is omitted in the sample support body 1E, and thus a gap is not formed between the first surface 3a of the ionization substrate 3 and the substrate 12. Like the sample support body 1B, in this sample support body 1E, a sample S overflowing out of openings of through-holes 3c which are adjacent to the first surface 3a of the ionization substrate 3 toward the substrate 12 can be moved into through-holes 12a of the substrate 12, by the through-holes 12a formed in the substrate 12. That is, like the aforementioned sample support bodies 1B to 1D, an excess of the sample S can also be inhibited from overflowing out on a second surface 3b by the sample support body 1E, and a reduction in ionization efficiency caused by a dropped amount of the sample S can be inhibited.

In the sample support body 1C or 1D, the support 5 may also be omitted. Even in this case, since the sample support body 1C or 1D includes the aforementioned substrate 22 or substrate 32, the excess of the sample S can be inhibited from overflowing out on the second surface 3b, and the reduction in ionization efficiency caused by the dropped amount of the sample S can be inhibited. However, like the sample support body 1B to 1D, even in the case where the aforementioned substrates 12, 22 and 32 are used, the gap may be formed between the first surface 3a of the ionization substrate 3 and the substrate 12, 22 or 32 by the support 5. In this case, since the excess of the sample S can be further released to the gap between the first surface 3a of the ionization substrate 3 and the substrate 12, 22 or 32, the excess of the sample S can be more effectively inhibited from overflowing out on the first surface 3a.

The ionization substrate 3 and the substrate 12 may be individually prepared in the sample support body 1E. For example, the ionization substrate 3 on which tapes 6 are provided may be a member that is distributed independently of the substrate 12. In this case, for example, an operator or the like fixes the ionization substrate 3 (i.e., the ionization substrate 3 including the tapes 6) to a surface of the substrate 12, and thus the aforementioned sample support body 1E is obtained.

Modifications

While embodiments of the present disclosure have been described, the present disclosure is not limited to the above embodiments, and can be variously modified without departing the subject matter thereof. For example, the configurations of the aforementioned sample support bodies 1, and 1A to 1E may be appropriately combined. For example, the frame 7 of the sample support body 1A may also be provided on the sample support bodies 1B to 1E whose substrates are processed.

Further, the configurations of some of the sample support bodies 1, and 1A to 1E may be appropriately omitted. For example, in the sample support body 1, in a case where the support 5 is the bonding member and the ionization substrate 3 and the substrate 2 are sufficiently fixed by the support 5, the tapes 6 may be omitted. Further, in the third process of the laser desorption/ionization method, a voltage may be applied to the conductive layer 4 without using the substrate 2, 12, 22 or 32 and the tapes 6. In this case, the substrate 2, 12, 22 or 32 and the tapes 6 may not have conductivity.

Further, the ionization substrate 3 may have conductivity. To be specific, the ionization substrate 3 may be formed of, for instance, a conductive material such as a semiconductor. In this case, a voltage may be applied to the ionization substrate 3 in the third process. In this case, in the sample support bodies 1 and 1A to 1E, the conductive layer 4 can be omitted, and the reduction in ionization efficiency caused by the dropped amount of the sample can be inhibited like the case where the sample support bodies 1 and 1A to 1E including the conductive layer 4 are used as described above.

For example, in a case where marking indicating boundaries of the measurement regions R are provided on the second surface 3b of the ionization substrate 3, the configuration for setting of the plurality of measurement regions R (in the above embodiments, the first support 5b or the wall 7b of the frame 7) may be omitted. Further, in the case where both the support 5 and the frame 7 are provided like the sample support body 1A, the plurality of measurement regions R may be set off by at least one of the first support 5b and the wall 7b. Further, the ionization substrate 3 may not necessarily have the plurality of measurement regions R, and the number of measurement regions R may be one.

Further, the first support 5b and the second support 5c may not be integrally formed. For example, the first support corresponding to one of the measurement regions R may be a member that is provided independently of the first support corresponding to the other measurement regions R. To be specific, when viewed in the Z direction, the first support corresponding to one of the measurement regions R may be, for instance, a cylindrical member that is formed to overlap the peripheral edge of the measurement region R. Further, the second support may be a member that is provided independently of the first support. To be specific, when viewed in the Z direction, the second support may be, for instance, a member that has a rectangular frame shape and is formed to overlap the peripheral edge of the ionization substrate 3.

Further, the wall 7b and the outer edge 7c may not be integrally formed. For example, the wall corresponding to one of the measurement regions R may be a member that is provided independently of the wall corresponding to the other measurement regions R. To be specific, when viewed in the Z direction, the wall corresponding to one of the measurement regions R may be, for instance, a cylindrical member that is formed to overlap the peripheral edge of the measurement region R. Further, the outer edge may be a member that is provided independently of the wall. To be specific, when viewed in the Z direction, the outer edge may be, for instance, a member that has a rectangular frame shape and is formed to overlap the peripheral edge of the ionization substrate 3.

Further, at least one of the plurality of measurement regions R may be used as a region for mass calibration. Before measurement of the sample to be measured (the aforementioned mass spectrometry method) is initiated, the measurement is performed by dropping a sample for mass calibration (e.g., peptide or the like) to the measurement region R that is set as the region for mass calibration, and thus a mass spectrum can be corrected. The correction of this mass spectrum is performed before the measurement of the sample to be measured, and thus an accurate mass spectrum of the sample to be measured when the sample to be measured is measured can be obtained.

Further, the laser desorption/ionization method (the first to third processes) can be also used in the mass spectrometry of the sample S described in the present embodiment as well as other measurements and experiments such as ion mobility measurement.

Further, use of the sample support bodies 1 and 1A to 1E is not limited to the ionization of the sample S caused by the application of the laser beam L. The sample support bodies 1 and 1A to 1E may be used in the ionization of the sample S caused by application of an energy beam (e.g., an ion beam, an electron beam, etc.) other than the laser beam L. That is, in the laser desorption/ionization method, in place of the laser beam L, the energy beam other than the laser beam L may be applied.

REFERENCE SIGNS LIST 1, 1A, 1B, 1C, 1D, 1E Sample support
2, 12, 22, 32 Substrate
3 Ionization substrate
3a First surface
3b Second surface
3c Through-hole
4 Conductive layer
5 Support
5a Through-hole
5b First support
5c Second support
6 Tape (fixing member)
7 Frame
7a Though-hole
7b Wall
7c Outer edge
L Laser beam
R Measurement region
S Sample

The invention claimed is:

1. A sample support body comprising:
a substrate;
an ionization substrate disposed on the substrate;
a support configured to support the ionization substrate with respect to the substrate such that a first surface of the ionization substrate which faces the substrate and the substrate are separated from each other; and
a frame at least formed on a peripheral edge of a second surface of the ionization substrate which is located on a side opposite to the first surface when viewed in a direction in which the substrate and the ionization substrate face each other,
wherein the ionization substrate has a plurality of measurement regions for dropping a sample on the second surface,
a plurality of through-holes that open in the first surface and the second surface are formed at least in the measurement regions of the ionization substrate,
a conductive layer is provided on peripheral edges of the through-holes at least on the second surface, and
the frame has a wall provided on peripheral edges of the measurement regions on the second surface to separate the plurality of measurement regions when viewed in the direction in which the substrate and the ionization substrate face each other.

2. The sample support body according to claim 1, wherein the conductive layer is formed to further cover a surface of the frame.

3. The sample support body according to claim 2, further comprising a fixing member having conductivity and mutually fix the ionization substrate and the substrate in contact with a portion of the conductive layer covering the surface of the frame.

4. The sample support body according to claim 1, wherein the support has a first support provided between the peripheral edges of the measurement regions on the first surface and the substrate to separate the plurality of measurement regions when viewed in the direction in which the substrate and the ionization substrate face each other.

5. The sample support body according to claim 4, wherein the first support is a bonding member bonding the ionization substrate and the substrate.

6. The sample support body according to claim 1, wherein the support has a second support provided between a peripheral edge of the ionization substrate and the substrate.

7. The sample support body according to claim 6, wherein the second support is a bonding member bonding the ionization substrate and the substrate.

8. The sample support body according to claim 1, wherein the substrate is formed of a conductive slide glass or a conductive metal.

9. The sample support body according to claim 1, wherein the ionization substrate is formed by anodizing a valve metal or silicon.

10. The sample support body according to claim 1, wherein widths of the through-holes range from 1 nm to 700 nm.

11. A sample support body comprising:
a substrate;
an ionization substrate configured to have conductivity and disposed on the substrate;
a support configured to support the ionization substrate with respect to the substrate such that a first surface of the ionization substrate which faces the substrate and the substrate are separated from each other; and
a frame at least formed on a peripheral edge of a second surface of the ionization substrate which is located on a side opposite to the first surface when viewed in a direction in which the substrate and the ionization substrate face each other,
wherein the ionization substrate has a plurality of measurement regions for dropping a sample on the second surface, a plurality of through-holes that open in the first surface and the second surface are formed at least in the measurement regions of the ionization substrate, and the frame has a wall provided on peripheral edges of the measurement regions on the second surface to set off the plurality of measurement regions when viewed in the direction in which the substrate and the ionization substrate face each other.

\* \* \* \* \*